US010003632B2

(12) United States Patent
Yun

(10) Patent No.: US 10,003,632 B2
(45) Date of Patent: Jun. 19, 2018

(54) USER TERMINAL APPARATUS, SERVER APPARATUS AND METHODS OF PROVIDING, BY THE USER TERMINAL APPARATUS AND THE SERVER APPARATUS, CONTINUOUS PLAY SERVICE

(71) Applicant: NAVER CORPORATION, Seongnam-si, Gyeonggi-do (KR)

(72) Inventor: Chan Ho Yun, Seongnam-si (KR)

(73) Assignee: Naver Corporation, Gyeonggi-do (KR)

( * ) Notice: Subject to any disclaimer, the term of this patent is extended or adjusted under 35 U.S.C. 154(b) by 355 days.

(21) Appl. No.: 14/790,167

(22) Filed: Jul. 2, 2015

(65) Prior Publication Data
US 2016/0057193 A1    Feb. 25, 2016

(30) Foreign Application Priority Data
Aug. 19, 2014 (KR) .................. 10-2014-0107892

(51) Int. Cl.
| | |
|---|---|
| G06F 15/16 | (2006.01) |
| H04L 29/08 | (2006.01) |
| G06F 17/30 | (2006.01) |
| G06F 21/10 | (2013.01) |
| H04L 29/06 | (2006.01) |

(52) U.S. Cl.
CPC ........ *H04L 67/02* (2013.01); *G06F 17/30884* (2013.01); *G06F 21/10* (2013.01); *H04L 63/08* (2013.01)

(58) Field of Classification Search
CPC ............. H04L 29/0809; H04L 41/0253; G06F 17/30861; G06F 17/30873; G06F 17/30884–17/3089; G06F 17/30905
See application file for complete search history.

(56) References Cited

U.S. PATENT DOCUMENTS

| | | | | |
|---|---|---|---|---|
| 6,100,890 A | * | 8/2000 | Bates ................ | G06F 17/30884 707/E17.114 |
| 8,392,617 B1 | * | 3/2013 | Weber ............... | G06F 17/30873 709/203 |

(Continued)

FOREIGN PATENT DOCUMENTS

| | | |
|---|---|---|
| KR | 10-2012-0135961 | 12/2012 |
| KR | 10-2014-0099167 | 8/2014 |

OTHER PUBLICATIONS

Jun. 30, 2015 Korean Office Action issued in corresponding Korean Application No. 10-2014-0107892.

*Primary Examiner* — Brendan Higa
(74) *Attorney, Agent, or Firm* — Harness, Dickey & Pierce, P.L.C.

(57) ABSTRACT

Provided is a method of providing, by a server apparatus, a continuous play service, the method including receiving user information from a first user terminal apparatus, obtaining at least one piece of web page information corresponding to the user information, and transmitting the at least one piece of web page information to the first user terminal apparatus such that the at least one piece of web page information is displayed on a screen of the first user terminal apparatus, wherein the at least one piece of web page information includes information about at least one web page previously accessed by a plurality of second user terminal apparatuses including the first user terminal apparatus.

19 Claims, 11 Drawing Sheets

(56) References Cited

U.S. PATENT DOCUMENTS

| | | | | |
|---|---|---|---|---|
| 8,775,682 B1* | 7/2014 | Mathias | G06F 17/30578 709/248 |
| 8,806,376 B2* | 8/2014 | Park | H04M 1/72544 715/705 |
| 2003/0095139 A1* | 5/2003 | Davidsson | G06F 17/3071 715/700 |
| 2003/0101175 A1* | 5/2003 | Gupta | G06F 17/30884 |
| 2005/0131859 A1* | 6/2005 | Li | G06F 17/30884 |
| 2006/0224997 A1* | 10/2006 | Wong | G06F 17/30884 715/838 |
| 2007/0136305 A1* | 6/2007 | Kelley | G06F 17/30884 |
| 2008/0163743 A1* | 7/2008 | Freedman | G06Q 30/08 84/609 |
| 2011/0010643 A1* | 1/2011 | Lee | H04M 1/72533 715/760 |
| 2011/0112824 A1* | 5/2011 | Sayers | G06F 17/27 704/9 |
| 2011/0320964 A1* | 12/2011 | Gambhir | G06F 3/0481 715/756 |
| 2012/0066634 A1* | 3/2012 | Kim | G06Q 30/02 715/777 |
| 2015/0347614 A1* | 12/2015 | Knight | G06F 17/30371 707/692 |

* cited by examiner

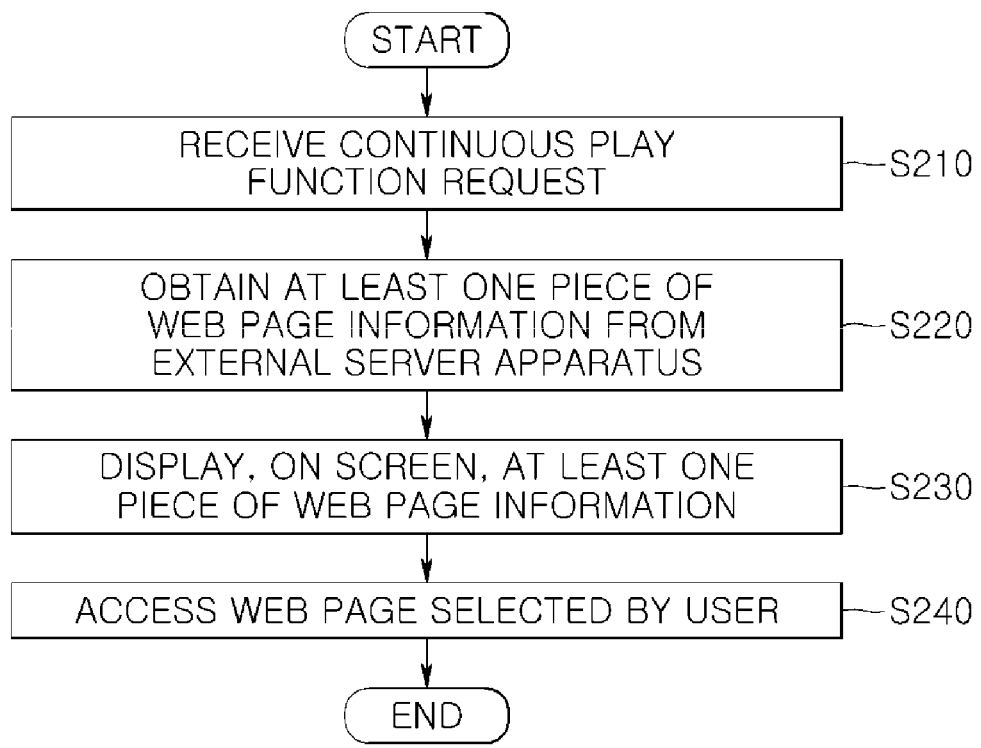

FIG. 3A
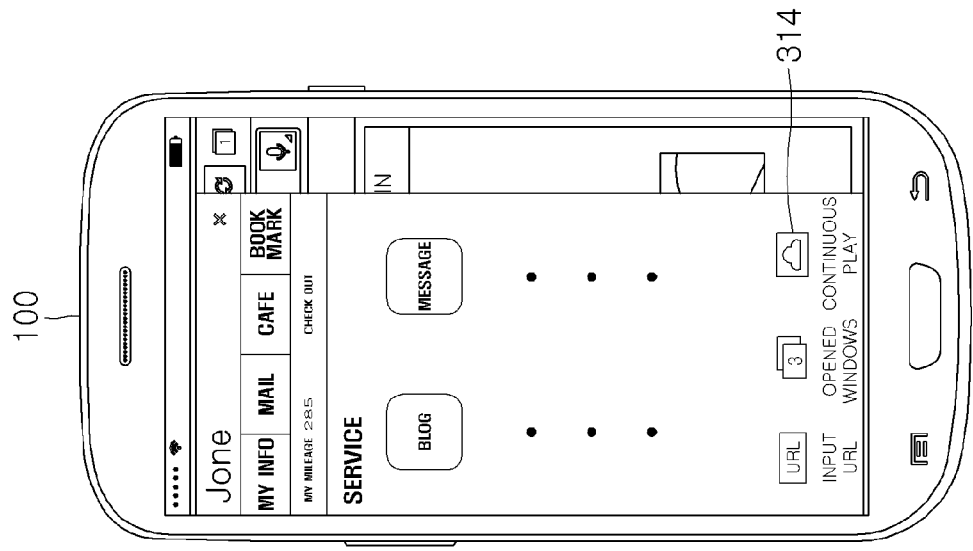
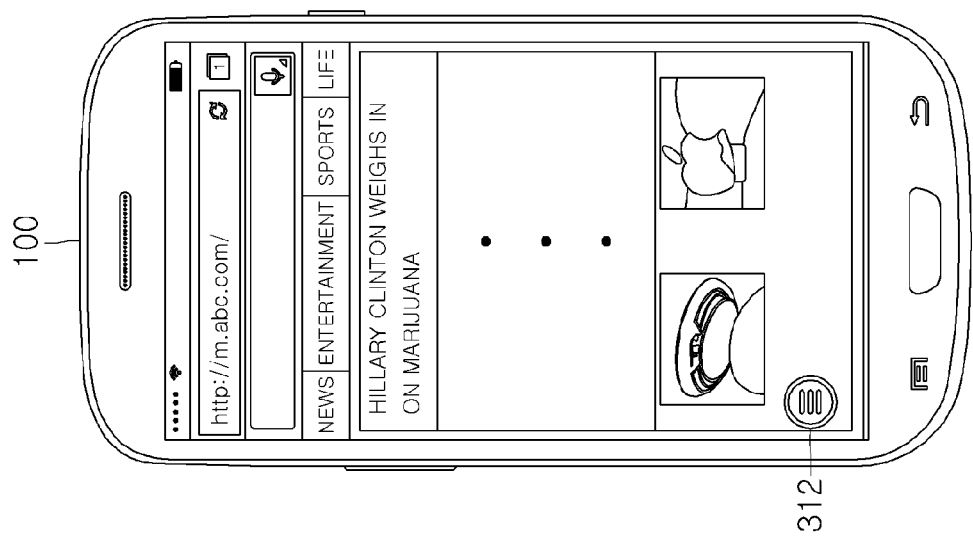

USER TERMINAL APPARATUS, SERVER APPARATUS AND METHODS OF PROVIDING, BY THE USER TERMINAL APPARATUS AND THE SERVER APPARATUS, CONTINUOUS PLAY SERVICE

CROSS-REFERENCE TO RELATED APPLICATION

This application claims priority from and the benefit of Korean Patent Application No. 10-2014-0107892, filed on Aug. 19, 2014, in the Korean Intellectual Property Office, the disclosure of which is incorporated herein in its entirety by reference.

BACKGROUND

1. Field of the Invention

The example embodiments relate to a user terminal apparatus, a server apparatus, and/or methods of providing, by the user terminal apparatus and the server apparatus, a continuous play service, and more particularly, to a user terminal apparatus and a server apparatus which provide a continuous play service of a web page, and methods of providing, by the user terminal apparatus and the server apparatus, the continuous play service.

2. Description of the Related Art

Following the development of smart devices, technical standards for enabling users to easily share services interworking between devices and executing the services are being established. For example, the Digital Living Network Alliance (DLNA) is an industrial standard that enable users to link devices in a home network, and is a beneficial element applied to smart televisions (TVs), smart phones, tablet personal computers (PCs), laptops, and audio devices.

Services that link and use user experiences between various smart screens are provided by various companies through development of smart devices and content infrastructures, and such services mostly target moving images, such as TV shows and movies.

These days, typical users own several smart devices, such as a smart phone, a tablet PC, a laptop, and a desktop, and thus a method of providing information about a web page accessed by the user using several smart devices through a continuous play service is required.

SUMMARY

One or more example embodiments include a user terminal apparatus, a server apparatus, and methods of providing, by the user terminal apparatus and the server apparatus, a continuous play service, which provide a continuous play service of a web page to a user.

One or more example embodiments include a user terminal apparatus, a server apparatus, and methods of providing, by the user terminal apparatus and the server apparatus, a continuous play service, which increase convenience of a user accessing a web page by using several smart devices.

One or more example embodiments include a user terminal apparatus, a server apparatus, and methods of providing, by the user terminal apparatus and the server apparatus, a continuous play service, which increase exposure of a web page through a continuous play function of the web page.

According to one or more example embodiments, a method of providing, by a server apparatus, a continuous play service, the method includes receiving user information from a first user terminal apparatus; obtaining at least one piece of web page information corresponding to the user information; and transmitting the at least one piece of web page information to the first user terminal apparatus such that the at least one piece of web page information is displayed on a screen of the first user terminal apparatus, wherein the at least one piece of web page information includes information about at least one web page previously accessed by at least one of a plurality of second user terminal apparatuses, the plurality of second user terminal apparatuses including the first user terminal apparatus.

According to one or more example embodiments, the obtaining of the at least one piece of web page information may include obtaining the at least one piece of web page information accessed by the at least one of the plurality of second user terminal apparatuses for a desired period of time.

According to one or more example embodiments, the method may further include receiving information about a web page from the first user terminal apparatus when the first user terminal apparatus accesses the web page, and updating the at least one piece of web page information previously accessed by the at least one of the plurality of second user terminal apparatus based on the information about the web page.

According to one or more example embodiments, the receiving of the information about the web page may include receiving the information about the web page from the first user terminal apparatus when the first user terminal apparatus maintains access to the web page for a desired period of time after accessing the web page.

According to one or more example embodiments, the receiving of the information about the web page may include receiving the information about the web page from the first user terminal apparatus when at least one of an image, a moving image, and a text is recorded on the web page by the first user terminal apparatus.

According to one or more example embodiments, the transmitting of the at least one piece of web page information to the first user terminal apparatus may include transmitting to the first user terminal apparatus, as the at least one piece of web page information, at least one of, information indicating a type of each of the plurality of second user terminal apparatuses that accessed the at least one web page, information indicating a date each of the plurality of second user terminal apparatuses that accessed the at least one web page, and information about a location of each of the plurality of second user terminal apparatuses that accessed the at least one web page.

According to one or more example embodiments, the transmitting of the at least one piece of web page information may include transmitting, as the at least one piece of web page information, a uniform resource locator (URL) of the at least one web page to the first user terminal apparatus.

According to one or more example embodiments, the method may further include transmitting to the first user terminal apparatus a control command associated with displaying, as a widget, the at least one piece of web page information on a wallpaper or a background screen of the first user terminal apparatus.

According to one or more example embodiments, the method may further include classifying the at least one piece of web page information into at least one group according to a desired standard, and transmitting the at least one piece of web page information classified into the at least one group to the first user terminal apparatus.

According to one or more example embodiments, the classifying may include classifying the at least one piece of web page information into the at least one group based on a URL of the at least one web page.

According to one or more example embodiments, the classifying may include extracting a representative phrase from each of the at least one piece of web page information, and classifying the at least one piece of web page information into the at least one group based on the representative phrase.

According to one or more example embodiments, the classifying may include classifying the at least one piece of web page information into the at least one group based on tag information associated with each of the at least one piece of web page information.

According to one or more example embodiments, the classifying may include classifying the at least one piece of web page information into the at least one group based on dates each of the plurality of second user terminal apparatuses accessed the at least one web page.

According to one or more example embodiments, the method may include obtaining a thumbnail image corresponding to each of the at least one web page, wherein the transmitting of the at least one piece of web page information comprises transmitting, as the at least one piece of web page information, the thumbnail image to the first user terminal apparatus.

According to one or more example embodiments, the obtaining of the thumbnail image may include obtaining, as the thumbnail image, at least one of an image of a representative phrase included in each of the at least one web page, an image included in each of the at least one web page, and an image of an entire region of each of the at least one web page.

According to one or more example embodiments, the method may include obtaining information associated with a spot displayed on a screen of one of the plurality of second user terminal apparatuses, which previously accessed a selected web page from an entire region of the selected web page, when the web page is selected by the first user terminal apparatus from the at least one piece of web page information, and transmitting a control command for displaying the spot on a screen of the first user terminal apparatus to the first user terminal apparatus.

According to one or more example embodiments, the method may include including information associated with a selected web page to a bookmark group when the web page is selected by the first user terminal apparatus from the at least one piece of web page information.

According to one or more example embodiments, the method may include receiving a continuous play function request from the first user terminal apparatus.

According to one or more example embodiments, the receiving of the continuous play function request may include transmitting an application program comprising a continuous play function menu to the first user terminal apparatus according to a request of the first user terminal apparatus, and receiving the continuous play function request from the first user terminal apparatus when a user of the first user terminal apparatus selects the continuous play function menu.

According to one or more example embodiments, the application program may display the continuous play function menu in a first region of the screen when the first user terminal apparatus accesses a web page corresponding to a URL through a web browser, and displays the continuous play function menu in a second region of the screen when the first user terminal apparatus accesses a web page that does not correspond to the URL.

According to one or more example embodiments, the application program may include a web browser or a toolbar program.

According to one or more example embodiments, the transmitting of the at least one piece of web page information may include transmitting the at least one piece of web page information to the first user terminal apparatus after classifying the at least one piece of web page information into information about a web page at least one of the plurality of second user terminal apparatuses is currently accessing and information about a web page at least one of the plurality of second user terminal apparatuses ended accessing. According to one or more example embodiments, a method of providing, by a server apparatus, a continuous play service, the method may include receiving first user information from a first user terminal apparatus; receiving information about a web page accessed by the first user terminal apparatus from the first user terminal apparatus; associating the user information and the information about the web page; receiving second user information from a second user terminal apparatus that is different from the first user terminal apparatus; and transmitting the information about the web page, which is associated with the user information, to the second user terminal apparatus, when the first user information corresponds to the second user information.

According to one or more example embodiments, a method of providing, by a first user terminal apparatus, a continuous play service, the method includes receiving a continuous play function request from a user; obtaining, from an external server, at least one piece of web page information previously accessed by at least one of a plurality of second user terminal apparatuses, the plurality of second user terminal apparatuses including the first user terminal apparatus; displaying the at least one piece of web page information on a screen of the first user terminal apparatus; and accessing a web page selected by the user from the at least one piece of web page information.

According to one or more example embodiments, the displaying of the at least one piece of web page information may include classifying the at least one piece of web page information into at least one group according to a desired standard, and displaying, on the screen, the at least one piece of web page information classified into the at least one group.

According to one or more example embodiments, the displaying of the at least one piece of web page information may include obtaining a thumbnail image corresponding to each of at least one web page, and displaying the thumbnail image on the screen.

According to one or more example embodiments, a computer-readable computer program product may be provided the computer program product stored in a non-transitory computer readable medium, the computer-readable program product comprising instructions, which when executed by a processor causes the processor to implement the operations of the various example embodiments described herein.

According to one or more example embodiments, a user terminal apparatus for providing a continuous play service to a user, the user terminal apparatus may include a memory having computer readable instructions stored thereon; and at least one processor configured to execute the computer readable instructions to, receive a continuous play function request from the user, obtain, from an external server, at least one piece of web page information previously accessed by at least one of a plurality of second user terminal apparatuses, the plurality of second user terminal apparatuses including the user terminal apparatus, display the at least one piece of web page information on a screen of the user terminal apparatus, and access a web page selected by the user from the at least one piece of web page information.

According to one or more example embodiments, a server apparatus may include a memory having a plurality of pieces of web page information and computer readable instructions stored thereon, and at least one processor configured to execute the computer readable instructions to, receive user information from a first user terminal apparatus, obtain at least one piece of web page information corresponding to the user information from among the plurality of pieces of web page information stored in the memory, and transmit the at least one piece of web page information to the first user terminal apparatus such that the at least one piece of web page information is displayed on a screen of the first user terminal apparatus, and the at least one piece of web page information includes information about at least one web page previously accessed by a least one of a plurality of second user terminal apparatuses, the plurality of second user terminal apparatuses including the first user terminal apparatus. According to one or more example embodiments, a server apparatus may include a memory having computer readable instructions stored thereon, and at least one processor configured to execute the computer readable instructions to, receive first user information from a first user terminal apparatus and information about a web page accessed by the first user terminal apparatus, receive second user information from a second user terminal apparatus different from the first user terminal apparatus, match and store in the memory the user information received from the first user terminal apparatus and the information about the web page, obtain, from the memory, the information about the web page matching the user information received from the second user terminal apparatus, and transmit the information about the web page to the second user terminal apparatus.

According to one or more example embodiments, a user terminal apparatus may include a memory having computer readable instructions stored thereon, and at least one processor configured to execute the computer readable instructions to, collect user information, the user information associated with a user of the user terminal apparatus, transmit the collected user information to an external device, receive information related to media content, the media content information corresponding to the user information, the media content information including information associated with at least one media content previously accessed by a second user terminal apparatus, and display the received media content information.

According to one or more example embodiments, the media content information may include a resource locator associated with the location of the media content.

According to one or more example embodiments, the media content information may include information associated with a spot of the media content, the spot indicating the location of the media content last accessed by the second user terminal apparatus, and the displaying includes displaying or playing the media content associated with the spot on a screen of the first user terminal apparatus.

According to one or more example embodiments, the media content may include at least one of a textual media content, a visual media content, or a sound media content.

BRIEF DESCRIPTION OF THE DRAWINGS

The foregoing and other features of the example embodiments will be apparent from the more particular description of non-limiting embodiments, as illustrated in the accompanying drawings in which like reference characters refer to like parts throughout the different views. The drawings are not necessarily to scale, emphasis instead being placed upon illustrating principles of inventive concepts. In the drawings:

FIG. 2 is a flowchart of a method of providing, by a first user terminal apparatus, a continuous play service, according to at least one example embodiment;

FIGS. 3A through 3C are diagrams of a continuous play function menu displayed on a screen of the first user terminal apparatus, according to some example embodiments;

DETAILED DESCRIPTION

Figure 1:
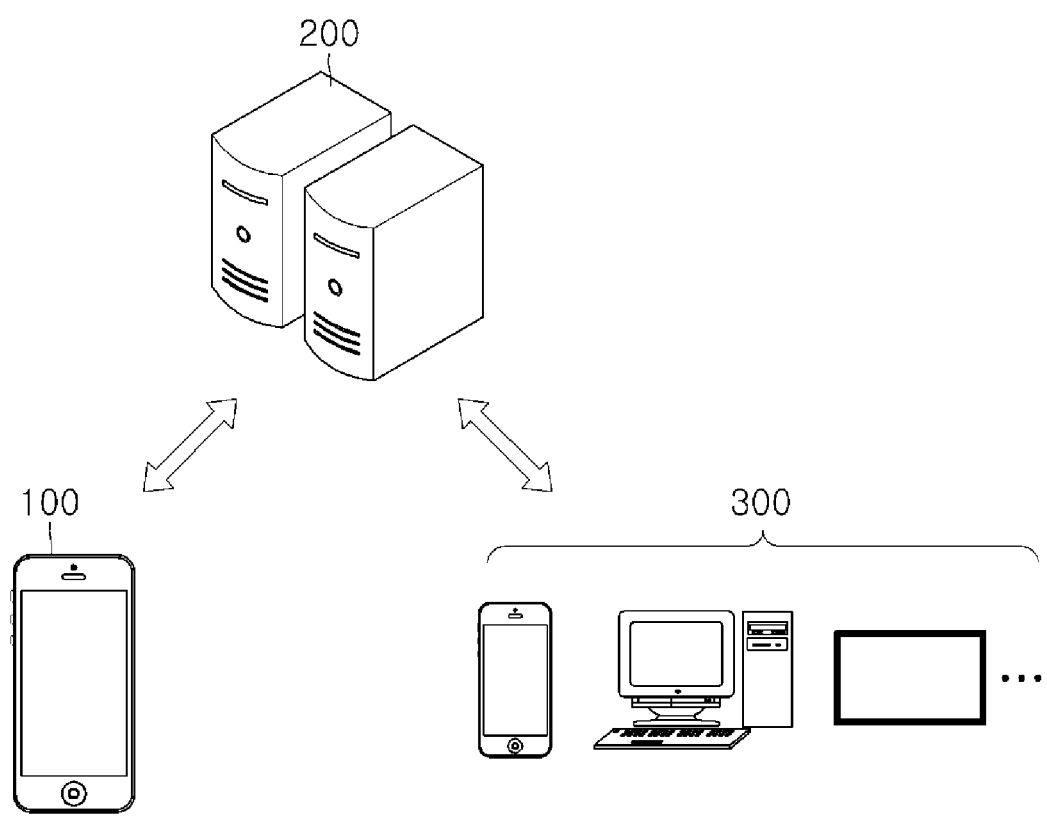
FIG. 1 is a diagram of a system for providing a continuous play service, according to at least one example embodiment.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of the example embodiments to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

In the present specification, a 'web page' should be construed as having broad meanings including passive or active document format viewable by using a web browser program, such as Internet Explorer. A format of a web page is usually HyperText Markup Language (HTML), but is not limited as long as the web page is in a document format viewable by using a web browser format, such as eXtensible Markup Language (XML) or Standard Generalized Markup Language (SGML). In order to view a web page by using a web browser program, the web page is generally accessed by inputting an address of the web page in a uniform resource locator (URL). A format of the address of the web page is usually in HyperText Transfer Protocol (HTTP), but is not limited thereto.

Hereinafter, example embodiments will be described with reference to the accompanying drawings.

FIG. 1 is a diagram of a system for providing a continuous play service, according to at least one example embodiment.

Referring to FIG. 1, the system according to at least one example embodiment includes a first user terminal apparatus 100, an external server apparatus 200, and a plurality of second user terminal apparatuses 300.

First, the second user terminal apparatuses 300 may include the first user terminal apparatus 100, and may include various types of terminal apparatuses, such as a smart phone, a personal digital assistant (PDA), a laptop, a tablet personal computer (PC), a desktop PC, a wearable device, etc., which may be connected to the external server apparatus 200 and a web server (not shown), through a communications and/or data network, such as the Internet. Additionally, the second user terminal apparatuses 300 may be executing different operating systems, different versions of operating systems, different software environments, etc.

A user may access various web pages and/or Internet media content (hereinafter referred to as "web page information") by executing a web browser program, smart device app, etc., through any of the second user terminal apparatuses 300 and input addresses, select web page links, content of the various web pages and/or media content.

The external server apparatus 200 collects pieces of web page information accessed by each of the second user terminal apparatuses 300. The external server apparatus 200 may collect the pieces of web page information as web page information visited by the user only when one or more of the second user terminal apparatuses 300 are authenticated as being used by the same user. Whether the second user terminal apparatuses 300 are used by the same user may be determined by using any one of various methods, such as a password authentication method or a certificate authentication method.

Additionally, the external server apparatus 200 may obtain an approval for collecting web page information from the user prior to collecting the pieces of web page information from each of the second user terminal apparatuses 300.

Also, the external server apparatus 200 may transmit an application program enabling the second user terminal apparatuses 300 to use a continuous play service to the second user terminal apparatuses 300 according to requests of the second user terminal apparatuses 300. The application program may include a web browser, a toolbar program, a smart device app, etc.

The first user terminal apparatus 100 is an apparatus providing a continuous play service of a web page and/or media content to the user, and may be any one of various types of terminal apparatuses, such as a smart phone, a PDA, a laptop, a tablet PC, a desktop PC, a wearable device, etc., which may be connected to the external server apparatus 200 and the server through the network.

The first user terminal apparatus 100 may transmit user information to the external server apparatus 200, and receive the pieces of web page information previously accessed by each of the second user terminal apparatuses 300 from the external server apparatus 200. The first user terminal apparatus 100 may display the pieces of web page information received from the external server apparatus 200 on a screen, and the user may select one of the pieces of web page information displayed on the screen to continuously access a web page and/or media content corresponding to the selected piece of web page information.

Generally, when a user wishes to view a web page and/or media content that was viewed by using a smart device again by using another smart device, the user has to directly search for the web page and/or media content by directly inputting a uniform resource locator (URL) of the web page, inputting a search word to a portal website, or accessing the content through a smart device app and/or other software. However, the accuracy of searching for the web page and/or media content to be viewed again on the other device is lower than desired.

Web browser programs, apps, and/or other software installed in smart devices may provide a bookmark, favorite, or other similar functionality, but in order to include a web page and/or Internet media content accessed by a user to a bookmark (favorite, etc.) group, an explicit act of including the web page and/or media content to the group is required, and it is difficult to synchronize such a function between different types of smart devices, particularly between smart devices operating different operating systems.

However, in a user terminal apparatus, a server apparatus, and methods of providing, by the user terminal apparatus and the server apparatus, a continuous play service, according to some example embodiments, a separate explicit action for a user to view a previously viewed web page and/or media content again is not required and a web page and/or media content is easily synchronized between different types of smart devices, and thus user convenience may be increased.

FIG. 2 is a flowchart of a method of providing, by the first user terminal apparatus 100, a continuous play service, according to at least one example embodiment.

First, in order to provide a continuous play service to a user, the external server apparatus 200 may obtain an approval for providing the continuous play service from the user through one of the second user terminal apparatuses 300. Upon obtaining the approval, the external server apparatus 200 may obtain pieces of web page information accessed by one or more of the second user terminal apparatuses 300.

In operation S210, the first user terminal apparatus 100 receives a continuous play function request from the user. The first user terminal apparatus 100 may display, on the screen of the first user terminal apparatus 100, a continuous play function menu, command, icon, etc., and the user may select the continuous play function menu displayed on the screen of the first user terminal apparatus 100 to transmit the continuous play function request to the first user terminal apparatus 100.

The continuous play function menu may be included in an application program executed by the first user terminal apparatus 100, for example, in a web browser or a toolbar program.

In operation S220, the first user terminal apparatus 100 obtains at least one piece of web page information previously accessed by at least one of the second user terminal apparatuses 300 from the external server apparatus 200. The first user terminal apparatus 100 may transmit user information to the external server apparatus 200 to obtain the at least one piece of web page information. The user information is information for identifying a user, and may include at least one of a name, a social security number, an address, identification number (ID), a password of the user, etc.

The external server apparatus 200 may transmit at least one piece of web page information accessed by the second user terminal apparatuses 300 for a desired (and/or pre-set) recent period, in other words a desired period of time, to the first user terminal apparatus 100, considering storage capacity of the external server apparatus 200. Additionally, the external server apparatus 200 may store only a desired and/or pre-set number of pieces of web page information from among at least one piece of web page information previously accessed by the second user terminal apparatuses 300, and transmit the stored desired and/or pre-set number of pieces of web page information to the first user terminal apparatus 100.

In operation S230, the first user terminal apparatus 100 displays, on the screen of the first user terminal apparatus 100, the at least one piece of web page information obtained from the external server apparatus 200. The first user terminal apparatus 100 may display the at least one piece of web page information via any one of various methods, which will be described later with reference to FIGS. 4A through 4C.

In operation S240, the first user terminal apparatus 100 accesses a web page and/or media content selected by the user from the at least one piece of web page information displayed on the screen.

The first user terminal apparatus 100 may access a web page address and/or media content corresponding to a type of the first user terminal apparatus 100 when accessing the web page and/or media content selected by the user. For example, when the web page selected by the user was previously accessed by a smart phone and the first user terminal apparatus 100 is a desktop PC, the first user terminal apparatus 100 may access the web page via a URL suitable to a desktop PC instead of a URL suitable to a smart phone. On the other hand, when the web page selected by the user was previously accessed by a desktop PC and the first user terminal apparatus 100 is a smart phone, the first user terminal apparatus 100 may access the web page via a URL suitable to a smart phone instead of a URL suitable to a desktop PC.

Additionally, if the user had previously accessed media content through a smart device app, the user may access the media content on a first user terminal apparatus 100 that was a desktop PC via a URL, desktop version of the app, or the like, suitable for the desktop PC.

The user may select the web page (media content, etc.) the user wants to visit again from the at least one piece of web page information displayed on the first user terminal apparatus 100 to view the web page again. For example, when the first user terminal apparatus 100 displays the web page selected by the user on the screen, the first user terminal apparatus 100 may obtain information about a spot from an entire region of the web page displayed on a screen of one of the plurality of second user terminal apparatuses, which previously accessed the web page, and display the web page based on the information about the spot. For example, when the one of second user terminal apparatuses 300 displayed a center region from the entire region of the web page, the first user terminal apparatus 100 may display the center region of the web page on the screen of the first user terminal apparatus 100. Accordingly, the user may view the web page through the first user terminal apparatus 100 from the spot that was viewed through the one of the second user terminal apparatuses 300 from the entire region of the web page. Additionally, if the user was viewing a video, listening to music, or the like, the user may view the video, listen to the music, etc., from the spot that was viewed/listened to through the one of the second user terminal apparatuses 300.

The information about the spot may be variously determined. For example, a spot displayed at the bottom of the screen of the one of the second user terminal apparatuses 300, a spot displayed at the top of the screen of the one of the second user terminal apparatuses 300, or a spot displayed at the center of the screen of the one of the second user terminal apparatuses 300 may be determined as the information about the spot.

Meanwhile, when the first user terminal apparatus 100 accessed a certain web page (media content, etc.) according to control of the user, information about the certain web page (media content, etc.) may be transmitted to the external server apparatus 200, and the external server apparatus 200 may update the at least one piece of web page information by using the information about the certain web page (media content, etc.). In detail, the external server apparatus 200 may determine that the information about the certain web page is latest, current, and/or updated information, and may match and store, correlate, and/or associate the information about the certain web page (media content, etc.) and the user information.

The first user terminal apparatus 100 automatically transmits the information about the certain web page (media content, etc.) to the external server apparatus 200 when the certain web page (media content, etc.) is accessed. In other words, a separate explicit action is not required to transmit the information about the certain web page (media content, etc.) to the external server apparatus 200, and the information about the certain web page (media content, etc.) may be transmitted to the external server apparatus 200 under a condition that the certain web page (media content, etc.) is accessed.

However, in this case, after the first user terminal apparatus 100 accesses the certain web page, the information about the certain web page (media content, etc.) may be transmitted to the external server apparatus 200 only when a certain and/or desired condition is satisfied, considering the storage capacity of the external server apparatus 200. For example, the information about the certain web page may be transmitted to the external server apparatus 200 only when the first user terminal apparatus 100 maintains the access to the certain web page for at least a certain and/or desired period of time. As another example, the information about the certain web page may be transmitted to the external server apparatus 200 only when at least one of an image, a moving image, audio, and/or a text is recorded on the certain web page according to control of the user, for example, when the user wrote a comment or interacts with the certain web page (media content, etc.) by using the first user terminal apparatus 100. When the access to the certain web page (media content, etc.) is maintained for at least the certain and/or desired period of time or the user interacts with the web page (media content, etc.), by, for example, writing a comment on, liking, favoriting, etc., the certain web page (media content, etc.), or the like, it may be determined that the user is interested in the certain web page (media content, etc.).

Figure 3B:
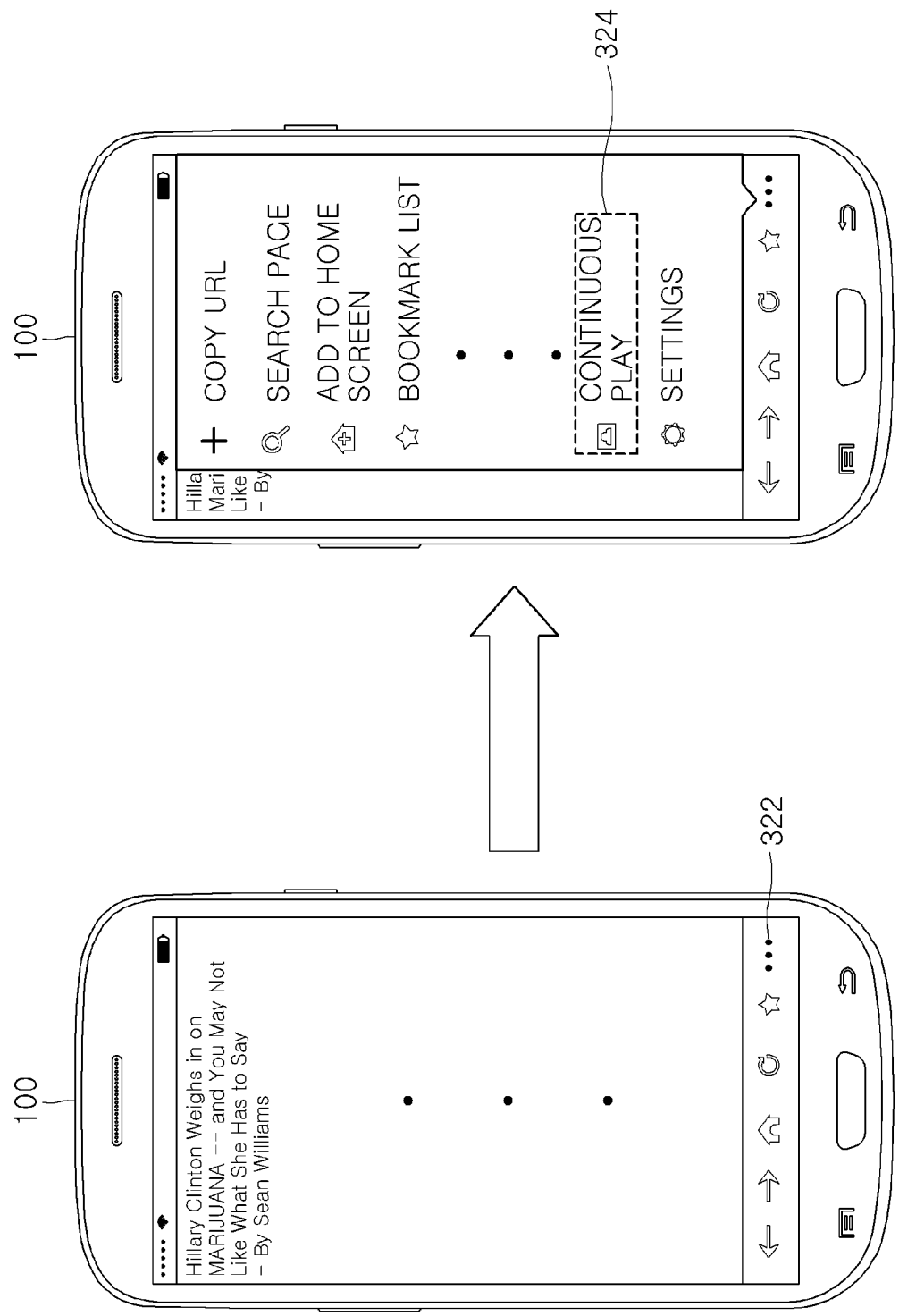
Figure 3C:
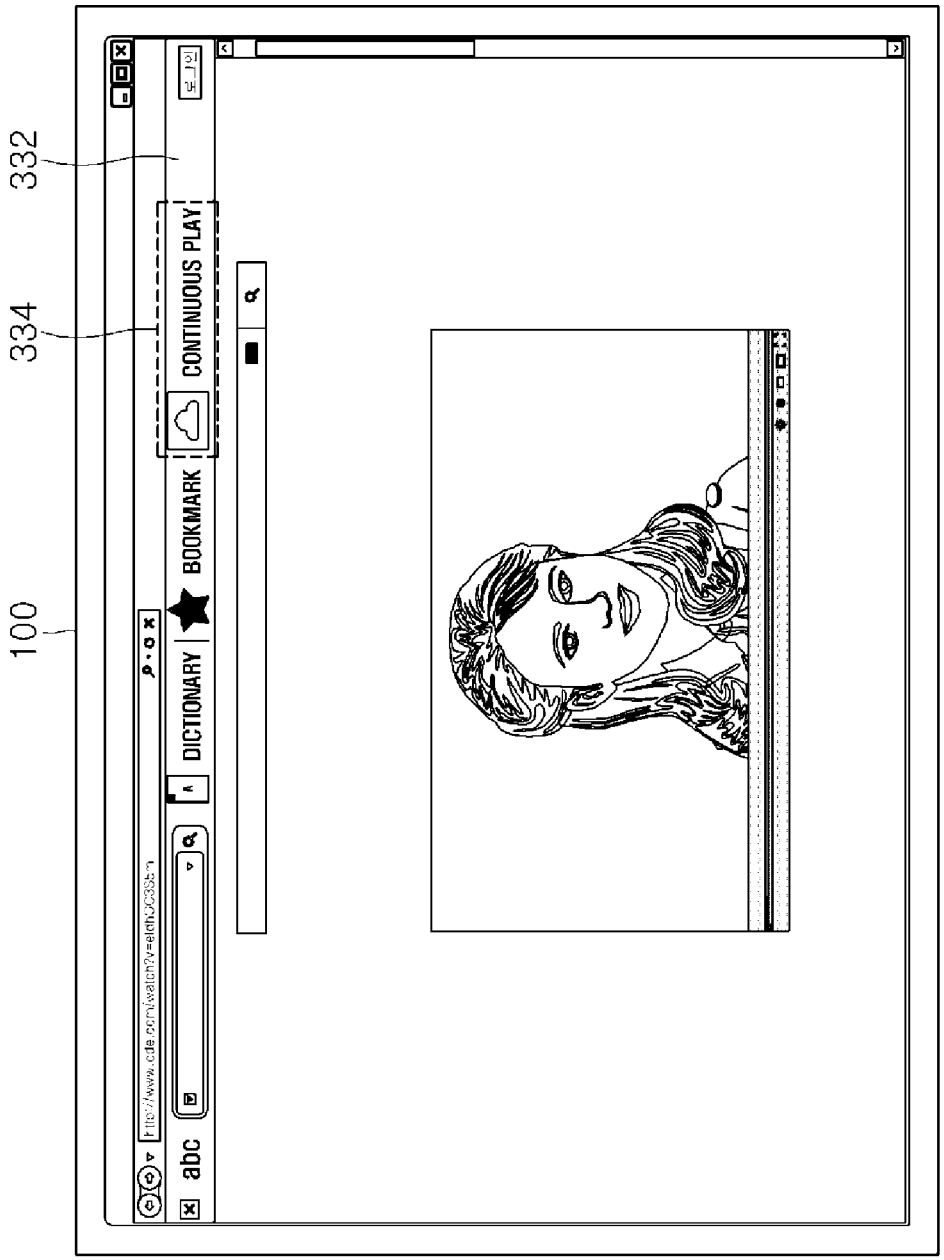

FIGS. 3A through 3C are diagrams of a continuous play function menu displayed on the screen of the first user terminal apparatus 100, according to some example embodiments.

As described above, the first user terminal apparatus 100 may display, on the screen, the continuous play function menu, and when the user selects the continuous play function menu, provide a continuous play service to the user. Here, the first user terminal apparatus 100 may variously display the continuous play function menu.

In order to use the continuous play service, the first user terminal apparatus 100 may receive an application program including the continuous play function menu from the external server apparatus 200. The application program may include a web browser, a toolbar program, a smart device app, or other similar software.

As shown in FIG. 3A, the first user terminal apparatus 100 may display a floating menu 312 on the screen while the web browser received from the external server apparatus 200 is being executed, and when the user selects the floating menu 312, display a menu list including a continuous play function menu 314 on the screen.

Additionally, as shown in FIG. 3B, the first user terminal apparatus 100 may display a menu bar 322 in a certain region of the screen, wherein the menu bar 322 may include a continuous play function menu 324.

When the first user terminal apparatus 100 accesses a web page (media content, etc.) corresponding to a desired and/or pre-set URL (or other resource locator) through the web browser, smart device app, etc., the continuous play function menu 314 may be included in a first region of the screen, for example, in the floating menu 312 as shown in FIG. 3A, and when the first user terminal apparatus 100 accesses a web page (media content, etc.) that does not correspond to the desired and/or pre-set URL (or other resource locator), the continuous play function menu 324 may be included in a second region of the screen, for example, in the menu bar 322 as shown in FIG. 3B.

When the application program is a toolbar program, a continuous play function menu 334 may be included in a toolbar region 332 of the toolbar program that may be executed when the web browser is executed, as shown in FIG. 3C. Also, the toolbar program may include the continuous play function menu 334 in a first region of the screen, for example, in the toolbar region 332, when the first user terminal apparatus 100 accessed a web page corresponding to a desired and/or pre-set URL through the web browser, and include the continuous play function menu 332 in a second region of the screen, for example, in a region other than the toolbar region 332, when the first user terminal apparatus 100 accessed a web page that does not correspond to the desired and/or pre-set URL.

The continuous play function menus 314 through 334 of FIGS. 3A through 3C are only examples, and the first user terminal apparatus 100 may display a continuous play function menu on the screen by using any one of various methods. Also, according to some example embodiments, the first user terminal apparatus 100 may provide the continuous play service to the user upon receiving any one of various inputs, such as a voice input, a fingerprint input, and an input of pressing an outer button mounted on the first user terminal apparatus 100, a remote control input, an input from a controller, etc.

Figure 4A:
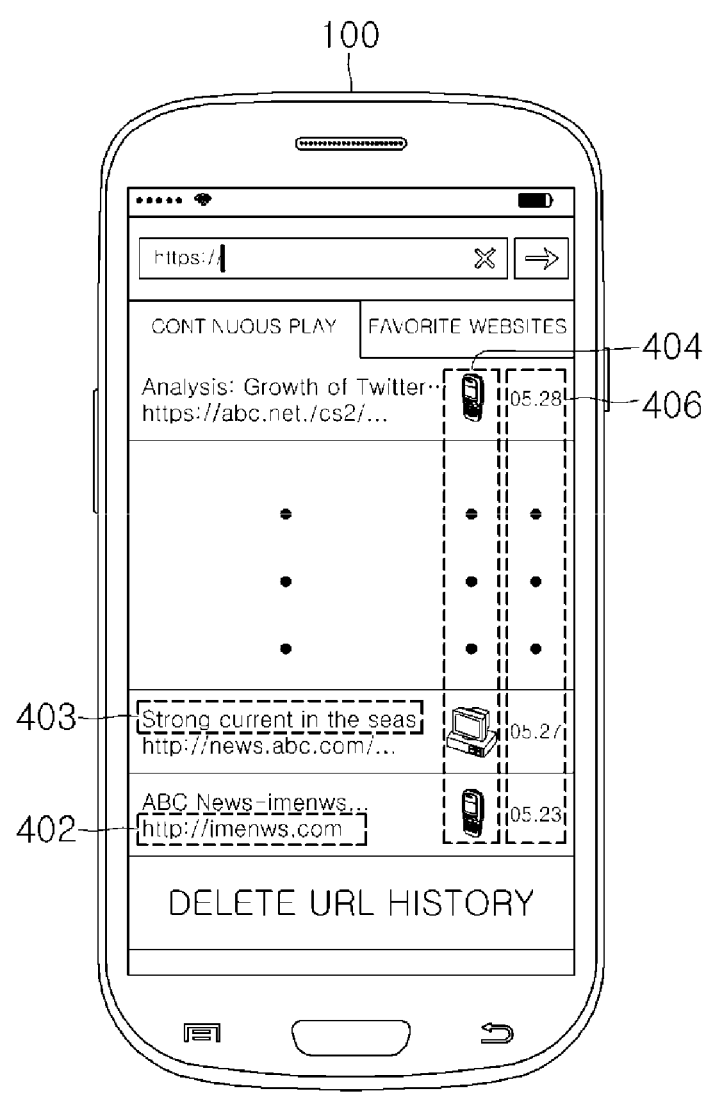
FIGS. 4A through 4C are diagrams of at least one piece of web page information displayed on the screen of the first user terminal apparatus, according to some example embodiments.
Figure 4B:
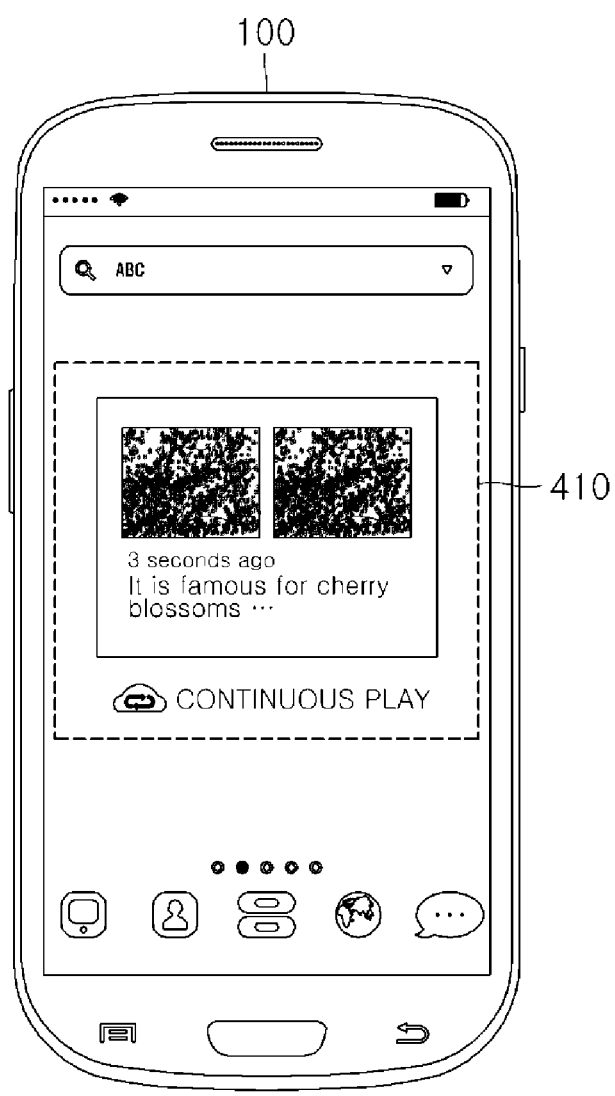
Figure 4C:
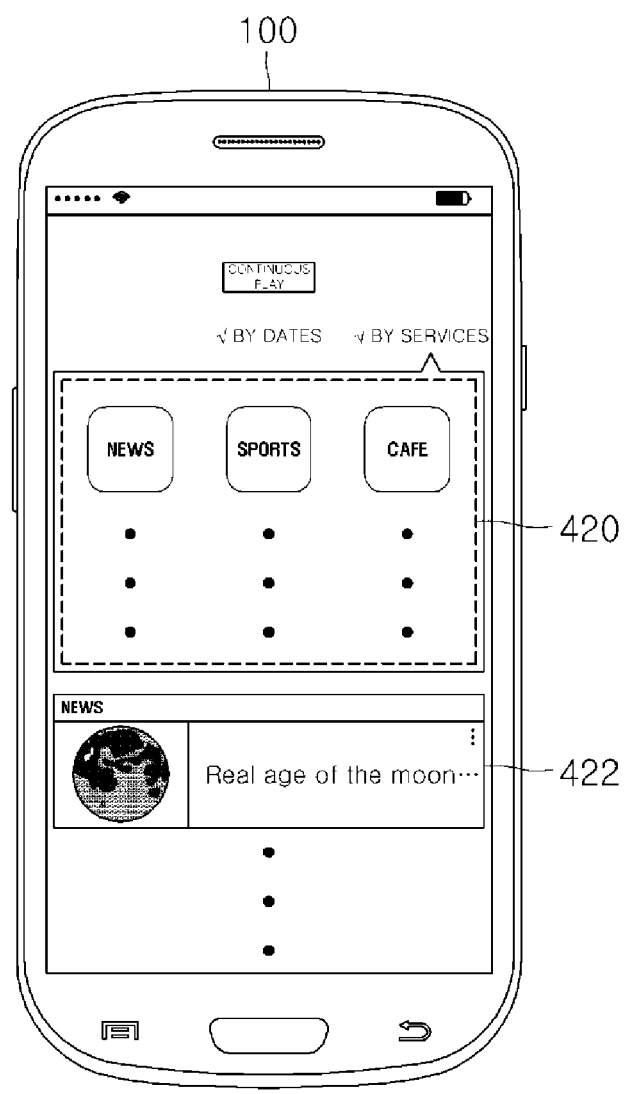

FIGS. 4A through 4C are diagrams of at least one piece of web page information displayed on the screen of the first user terminal apparatus 100, according to some example embodiments.

The first user terminal apparatus 100 may display, on the screen, at least one piece of web page information received from the external server apparatus 200 via any one of various methods considering user convenience.

As shown in FIG. 4A, according to at least one example embodiment but not limited thereto, the first user terminal apparatus 100 may display a URL 402 corresponding to each of the at least one web page as the at least one piece of web page information. Also, together with the URL 402, the first user terminal apparatus 100 may display, on the screen, at least one of a representative phrase 403 of each web page, a type 404 of the second user terminal apparatus 300 accessed each web page, information 405 about a date when each web page was accessed, and information about a location of the second user terminal apparatus 300 that accessed each web page.

The representative phrase 403 may include a part of a title or text of each web page. Also, the type 404 may include information about whether the second user terminal apparatus 300 is a PC, a smart phone, a tablet PC, etc. The information about the location is information about where the second user terminal apparatus 300 accessed each web page, and for example, when the second user terminal apparatus 300 accessed a web page, the external server apparatus 200 may receive global positioning system (GPS) information from the second user terminal apparatus 300 to determine where the web page was accessed.

According to some example embodiments, the first user terminal apparatus 100 may display the at least one piece of web page information in a thumbnail image corresponding to each of the at least one piece of web page information. Accordingly, the first user terminal apparatus 100 may generate the thumbnail image or receive the thumbnail image from the external server apparatus 200.

The thumbnail image may be at least one of an image indicating a representative phrase included in each web page, an image included in each web page, and an image indicating an entire region of each web page.

The user may accurately identify and determine a web page provided via the continuous play function through various types of information about the web page displayed on the screen.

Referring to FIG. 4B, according to at least one example embodiment but not limited thereto, the first user terminal apparatus 100 may display the at least one piece of web page information as a widget 410 on a wallpaper or a background screen of the first user terminal apparatus 100. When the at least one piece of web page information is displayed as the widget 410, the user may select the widget 410 without having to execute a web browser to use the continuous play function, thereby directly accessing a desired web page.

Additionally, referring to FIG. 4C, the first user terminal apparatus 100 may classify the at least one piece of web page information into at least one group according to a desire and/or certain standard, and then display information 420 about the at least one group on the screen of the first user terminal apparatus 100. According to some example embodiments, the first user terminal apparatus 100 may not directly classify the at least one piece of web page information, but may receive the at least one piece of web page information classified by the external server apparatus 200 from the external server apparatus 200. When one group is selected by the user from the information 420, the first user terminal apparatus 100 may display, on the screen, web page information included in the selected group.

In FIG. 4C, the at least one piece of web page information is classified according to desired and/or pre-set tag information with respect to the at least one piece of web page information, wherein the desired and/or pre-set tag information is information indicating to which category each web page is included.

As shown in FIG. 4C, the first user terminal apparatus 100 may classify the at least one piece of web page information into news, sports, blogs, etc. based on the desired and/or pre-set tag information. When the user selects news, the first user terminal apparatus 100 displays, on the screen, web page information 422 included in the news.

According to some example embodiments, the first user terminal apparatus 100 may classify the at least one piece of web page information based on a URL of each web page, by a resource locator for the media content, etc. For example, the first user terminal apparatus 100 may check a representative domain address of each web page through the URL of each web page, and classify the at least one piece of web page information into at least one group according to the representative domain address.

Additionally, the first user terminal apparatus 100 may extract or generate a representative phrase from each of the at least one piece of web page information, and classify the at least one piece of web page information into at least one group based on the representative phrase. The representative phrase may include a certain word or a certain phrase included in each web page or media content, or may generate a word or phrase based on the content of the web page or media content. For example, when first web page information and second web page information include a word 'food', and third web page information includes a word 'car', the first user terminal apparatus 100 may include the first and second web page information to a group named 'food', and the third web page information to a group named 'car'.

Additionally, the first user terminal apparatus 100 may classify the at least one piece of web page information into at least one group based on a date the second user terminal apparatus 300 accessed at least one web page.

Meanwhile, the first user terminal apparatus 100 may classify the at least one piece of web page information received from the external server apparatus 200 into web page information the second user terminal apparatuses 300 are continuously accessing and web page information the second user terminal apparatuses 300 ended accessing. Accordingly, the user may view a web page being displayed on a screen of one of the second user terminal apparatuses 300 also through the first user terminal apparatus 100.

Figure 5:
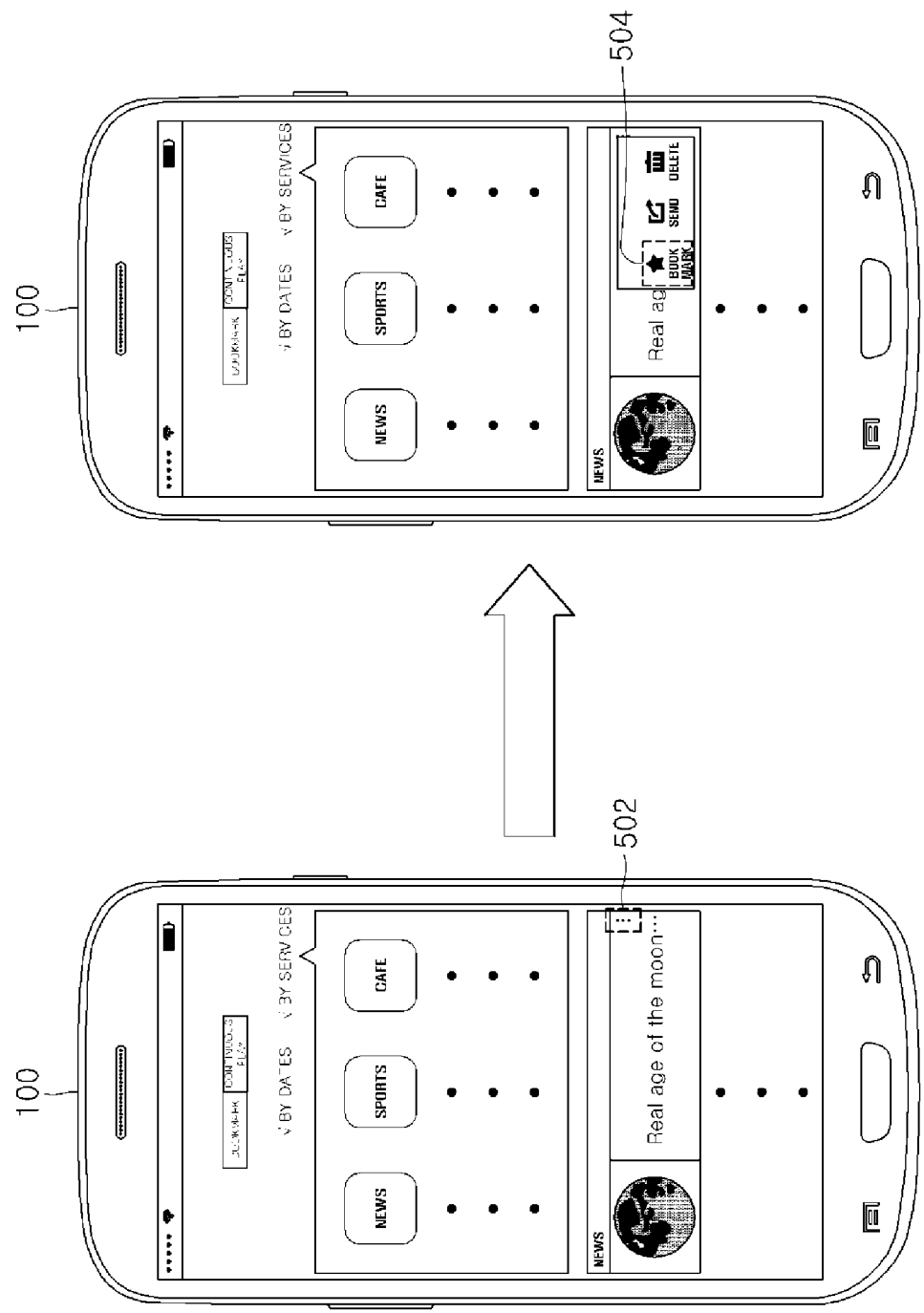
FIG. 5 is a diagram for describing a bookmark function provided by the first user terminal apparatus, according to at least one example embodiment.

FIG. 5 is a diagram for describing a bookmark function provided by the first user terminal apparatus 100, according to at least one example embodiment.

The first user terminal apparatus 100 may include web page information selected by the user from among the at least one piece of web page information displayed on the screen to a bookmark group. For example, a web page that interests the user from among at least one web page that is a target of the continuous play service is included in the bookmark group according to selection of the user.

As shown in FIG. 5, the first user terminal apparatus 100 may include an additional menu 502 to a region where web page information is displayed, and when the user selects the additional menu 502, display a bookmark menu 504 on the screen. The user may select the bookmark menu 504 displayed on the screen to include the selected web page information to a bookmark group. However, FIG. 5 illustrates only an example, and the first user terminal apparatus 100 may display a bookmark menu for including web page information to a bookmark group in any one of various methods.

Figure 6:
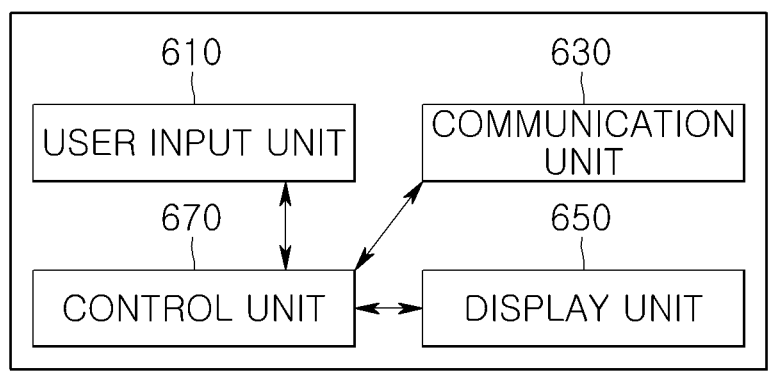
FIG. 6 is a block diagram of a first user terminal apparatus according to at least one example embodiment.

FIG. 6 is a block diagram of a first user terminal apparatus 600 according to at least one example embodiment.

Referring to FIG. 6, the first user terminal apparatus 600 according to at least one example embodiment includes a user input unit 610, a communication unit 630, a display unit 650, and a control unit 670. The user input unit 610, the communication unit 630, the display unit 650, and the control unit 670 may be configured as at least one microprocessor (not shown) or as separate processing devices, such as a Network Interface Card (NIC), wireless radio controller, video graphics controller processor, input/output controller, etc., and may operate under control of programs stored in a memory (not shown). Additionally, the user input unit 610, the communication unit 630, the display unit 650, the at least one microprocessor, and the memory may communicate with one another via a communication bus (not shown).

The user input unit 610 may receive a certain input from a user, and in detail, may receive a continuous play function request from the user. The user may transmit the continuous play function request by using a mouse, a keyboard, a touch screen, voice, or other input device.

The communication unit 630 may communicate with the external server apparatus 200 or a web server, and obtains at least one piece of web page information previously accessed by the second user terminal apparatuses 300 including the first user terminal apparatus 600 from the external server apparatus 200. The communication unit 630 may transmit user information to the external server apparatus 200 so as to receive the at least one piece of web page information from the external server apparatus 200.

Also, the communication unit 630 may receive an application program for using a continuous play service, such as a web browser or a toolbar program, from the external server apparatus 200.

The display unit 650 displays the at least one piece of web page information obtained by the communication unit 630, on a screen. The display unit 650 may display the at least one piece of web page information via any one of various methods as described above.

The communication unit 630 may access a web page and/or media content selected by the user from the at least one piece of web page information displayed on the screen of the display unit 650, and the display unit 650 may display the selected web page and/or media content on the screen.

Also, when a certain web page and/or media content is accessed according to manipulation of the user, the communication unit 630 may transmit information about the certain web page and/or media content to the external server apparatus 200 such that the certain web page and/or media content is subjected to the continuous play service.

The control unit 670 controls operations of the user input unit 610, the communication unit 630, and the display unit 650.

When the communication unit 630 receives at least one piece of web page information from the external server apparatus 200, the control unit 670 may classify the at least one piece of web page information into at least one group according to a desired and/or certain standard. Additionally, when the communication unit 630 receives web page information, such as a URL or other resource locator, from the external server apparatus 200, the control unit 670 may generate a thumbnail image, or other visual indicator corresponding to and/or representing the web page information.

Figure 7:
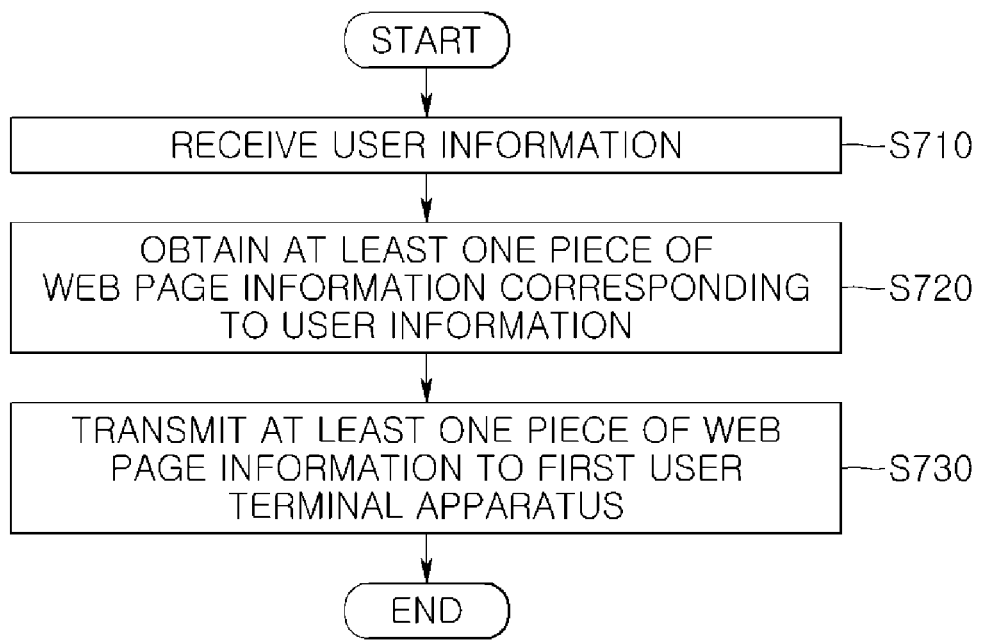
FIG. 7 is a flowchart of a method of providing, by a server apparatus, a continuous play service, according to at least one example embodiment.

FIG. 7 is a flowchart of a method of providing, by the external server apparatus 200, a continuous play service, according to at least one example embodiment.

In operation S710, the external server apparatus 200 receives user information from the first user terminal apparatus 100. The user information is information for identifying a user, and may include at least one of a name, an address, a social security number, an ID, and a password of the user.

While receiving the user information from the first user terminal apparatus 100, the external server apparatus 200 may also receive a continuous play function request. In this regard, the external server apparatus 200 may transmit an application program enabling the first user terminal apparatus 100 to use a continuous play service, such as a web browser, a toolbar program, a smart device app, etc., to the first user terminal apparatus 100.

In operation S720, the external server apparatus 200 obtains at least one piece of web page information corresponding to the user information. The external server apparatus 200 may extract and/or generate the at least one piece of web page information corresponding to the user information received from the first user terminal apparatus 100, from among a plurality of pieces of web page information matched and stored according to several users. Additionally, the external server apparatus 200 may extract and/or generate at least one piece of web page information accessed by the second user terminal apparatuses 300 for a desired and/or pre-set recent period, or a desired and/or pre-set number of pieces of web page information.

The at least one piece of web page information corresponding to the user information may include information about at least one web page previously accessed by the second user terminal apparatuses 300 including the first user terminal apparatus 100.

When the second user terminal apparatuses 300 each access at least one web page and/or media content, the second user terminal apparatuses 300 may automatically transmit information about the at least one web page and/or media content to the external server apparatus 200, and the external server apparatus 200 may match and store, associate with, and/or correlate the information about the at least one web page and/or media content previously accessed by the second user terminal apparatuses 300 and user information transmitted from each of the second user terminal apparatuses 300.

In operation S730, the external server apparatus 200 transmits the at least one piece of web page information to the first user terminal apparatus 100 to be displayed on the screen of the first user terminal apparatus 100.

The at least one piece of web page information transmitted to the first user terminal apparatus 100 by the external server apparatus 200 may be in various forms.

For example, the external server apparatus 200 may transmit to the first user terminal apparatus 100, as the at least one piece of web page information, at least one of a type of the second user terminal apparatus 300 that accessed each web page and/or media content, information about a date the second user terminal apparatus 300 accessed each web page and/or media content, information about a location of the second user terminal apparatus 300 that accessed each web page and/or media content, etc.

As another example, the external server apparatus 200 may transmit to the first user terminal apparatus 100, as the at least one piece of web page information, a URL or other resource locator of each web page and/or media content.

As another example, the external server apparatus 200 may classify the at least one piece of web page information into at least one group according to a desired and/or certain standard, and transmit the at least one piece of web page information classified into the at least one group to the first user terminal apparatus 100. According to some example embodiments, the external server apparatus 200 may not directly classify the at least one piece of web page information into the at least one group, but may transmit a control command requesting the first user terminal apparatus 100 to classify the at least one piece of web page information into the at least one group, while transmitting the at least one piece of web page information to the first user terminal apparatus 100.

As another example embodiment, the external server apparatus 200 may obtain a thumbnail image, or other visual indicator, corresponding to each web page and/or media content, and then transmit the thumbnail image, or other visual indicator, to the first user terminal apparatus 100 as the at least one piece of web page information. According to some example embodiments, the external server apparatus 200 may not directly obtain a thumbnail image, but may transmit a control command requesting the first user terminal apparatus 100 to obtain a thumbnail image corresponding to each web page to the first user terminal apparatus 100, while transmitting the at least one piece of web page information to the first user terminal apparatus 100.

While transmitting the at least one piece of web page information in various forms to the first user terminal apparatus 100, the external server apparatus 200 may transmit a control command requesting the first user terminal apparatus 100 to display the at least one piece of web page information as a widget on the wallpaper or the background screen of the first user terminal apparatus 100 to the first user terminal apparatus 100.

Also, before transmitting the at least one piece of web page information in various forms to the first user terminal apparatus 100, the external server apparatus 200 may classify the at least one piece of web page information into web page information the second user terminal apparatuses 300 are currently and/or continuously accessing and web page information the second user terminal apparatuses 300 is not accessing.

Meanwhile, when the first user terminal apparatus 100 accesses a certain web page, the external server apparatus 200 may receive information about the certain web page and/or media content from the first user terminal apparatus 100 and update the at least one piece of web page information.

Also, when the first user terminal apparatus 100 selects a web page and/or media content from the at least one piece of web page information transmitted to the first user terminal apparatus 100, the external server apparatus 200 may obtain information about a spot from an entire region of the web page and/or media content displayed on a screen of the second user terminal apparatus 300 that previously accessed the web page and/or media content, and transmit a control command for displaying the spot on the screen of the first user terminal apparatus 100 to the first user terminal apparatus 100.

Also, when the first user terminal apparatus 100 selects a web page and/or media content from the at least one piece of web page information, the external server apparatus 200 may include information about the selected web page to a bookmark group.

Figure 8:
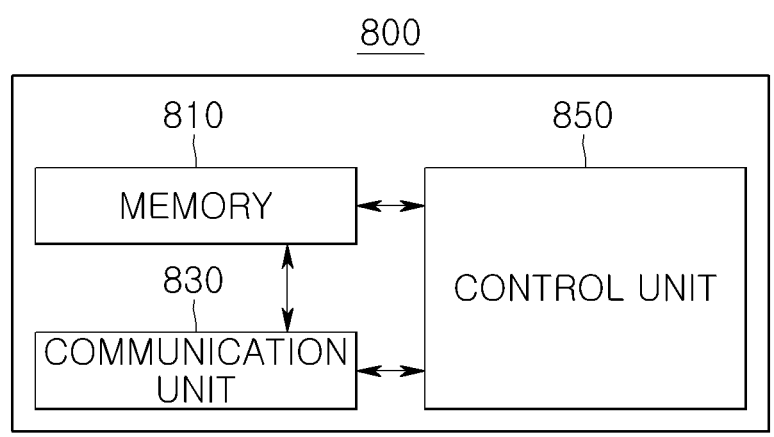
FIG. 8 is a block diagram of a server apparatus according to at least one example embodiment.

FIG. 8 is a block diagram of a server apparatus 800 according to at least one example embodiment.

Referring to FIG. 8, the server apparatus 800 according to at least one example embodiment includes a memory 810, a communication unit 830, and a control unit 850. The memory 810, the communication unit 830, and the control unit 850 may be configured as at least one microprocessor, or as separate processing devices, such as a Network Interface Card (NIC), wireless radio controller, etc., and the communication unit 830 and the control unit 850 may operate under control of programs stored in the memory 810. Additionally, the user input unit 610, the communication unit 630, the display unit 650, the at least one microprocessor, and the memory may communicate with one another via a communication bus (not shown).

The memory 810 stores pieces of web page information. The pieces of web page information may be matched to user information of several users and stored in the memory 801.

The communication unit 830 receives user information from the first user terminal apparatus 100. Also, the communication unit 830 may transmit an application program for using a continuous play service to the first user terminal apparatus 100 according to a request of the first user terminal apparatus 100.

The control unit 850 obtains at least one piece of web page information corresponding to the user information received from the first user terminal apparatus 100, from among the pieces of web page information stored in the memory 810. The at least one piece of web page information includes information about at least one web page previously accessed by the second user terminal apparatuses 300 including the first user terminal apparatus 100.

The control unit 850 may match the information about the at least one web page previously accessed by the second user terminal apparatuses 300 to the user information transmitted from the second user terminal apparatuses 300, and store the information about the at least one web page in the memory 810. When each of the second user terminal apparatuses 300 accesses at least one web page, information about the at least one web page may be automatically transmitted to the server apparatus 800.

The communication unit 830 transmits the at least one piece of web page information obtained by the control unit 850 to the first user terminal apparatus 100 to be displayed on the screen of the first user terminal apparatus 100. Since the at least one piece of web page information transmitted by the communication unit 830 to the first user terminal apparatus 100 has been described above, details thereof are not provided again.

A user terminal apparatus, a server apparatus, and methods of providing, by the user terminal apparatus and the server apparatus, a continuous play service, according to some example embodiments may provide a continuous play service of a web page to a user.

A user terminal apparatus, a server apparatus, and methods of providing, by the user terminal apparatus and the server apparatus, a continuous play service, according to some example embodiments may increase convenience of a user accessing a web page by using several smart devices.

A user terminal apparatus, a server apparatus, and methods of providing, by the user terminal apparatus and the server apparatus, a continuous play service, according to some example embodiments may increase exposure of a web page through a continuous play function of the web page.

The units and/or modules described herein may be implemented using hardware components, software components, or a combination thereof. For example, the hardware components may include microcontrollers, memory modules, sensors, amplifiers, band-pass filters, analog to digital converters, and processing devices, or the like. A processing device may be implemented using one or more hardware device(s) configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device(s) may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors, multi-core processors, distributed processing, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, and/or computer storage medium or device. The software also may be distributed over network coupled computer systems so that the software is stored and executed in a distributed fashion. The software and data may be stored by one or more computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A method of providing a continuous play service by a server apparatus, the method comprising:
   receiving, using at least one processor, user information from a first user terminal apparatus;
   receiving, using the at least one processor, at least one piece of web page information corresponding to the user information from a plurality of second user terminal apparatuses, the at least one piece of web page information including information corresponding to at least one web page previously accessed by the plurality of second user terminal apparatuses;
   transmitting, using the at least one processor, the at least one piece of web page information to the first user terminal apparatus such that the at least one piece of web page information is displayed on a screen of the first user terminal apparatus;
   receiving, using the at least one processor, information associated with a spot displayed on a screen of one of the plurality of second user terminal apparatuses from an entire region of a selected web page which was previously accessed by the one of the plurality of second user terminal apparatuses, when the web page is selected by the first user terminal apparatus from the at least one piece of web page information; and
   transmitting, using the at least one processor, a control command for displaying the spot on the screen of the first user terminal apparatus to the first user terminal apparatus,
   the plurality of second user terminal apparatuses including the first user terminal apparatus.

2. The method of claim 1, further comprising:
   receiving, using the at least one processor, information about the web page from the first user terminal apparatus when the first user terminal apparatus accesses the web page; and
   updating, using the at least one processor, the at least one piece of web page information previously accessed by the at least one of the plurality of second user terminal apparatus based on the information about the web page.

3. The method of claim 2, wherein the receiving of the information about the web page comprises:
   receiving the information about the web page from the first user terminal apparatus when the first user terminal apparatus maintains access to the web page for a desired period of time after accessing the web page.

4. The method of claim 2, wherein the receiving of the information about the web page comprises:
   receiving the information about the web page from the first user terminal apparatus when at least one of an image, a moving image, and a text is recorded on the web page by the first user terminal apparatus.

5. The method of claim 1, wherein the transmitting of the at least one piece of web page information to the first user terminal apparatus comprises:
   transmitting to the first user terminal apparatus, as the at least one piece of web page information, at least one of,
      information indicating a type of each of the plurality of second user terminal apparatuses that accessed the at least one web page,
      information indicating a date each of the plurality of second user terminal apparatuses that accessed the at least one web page, and
      information about a location of each of the plurality of second user terminal apparatuses that accessed the at least one web page.

6. The method of claim 1, further comprising:
   transmitting, using the at least one processor, to the first user terminal apparatus a control command associated with displaying, as a widget, the at least one piece of web page information on a wallpaper or a background screen of the first user terminal apparatus.

7. The method of claim 1, further comprising:
   classifying, using the at least one processor, the at least one piece of web page information into at least one group according to a desired standard; and
   transmitting, using the at least one processor, the at least one piece of web page information classified into the at least one group to the first user terminal apparatus.

8. The method of claim 7, wherein the classifying comprises classifying the at least one piece of web page information into the at least one group based on a URL of the at least one web page.

9. The method of claim 7, wherein the classifying comprises:
   extracting a representative phrase from each of the at least one piece of web page information; and classifying the at least one piece of web page information into the at least one group based on the representative phrase.

10. The method of claim 7, wherein the classifying comprises:
classifying the at least one piece of web page information into the at least one group based on tag information associated with each of the at least one piece of web page information.

11. The method of claim 7, wherein the classifying comprises:
classifying the at least one piece of web page information into the at least one group based on dates each of the plurality of second user terminal apparatuses accessed the at least one web page.

12. The method of claim 1, further comprising:
obtaining a thumbnail image corresponding to each of the at least one web page,
wherein the transmitting of the at least one piece of web page information includes transmitting, as the at least one piece of web page information, the thumbnail image to the first user terminal apparatus.

13. The method of claim 1, further comprising:
including, using the at least one processor, information associated with a selected web page to a bookmark group when the web page is selected by the first user terminal apparatus from the at least one piece of web page information.

14. The method of claim 1, further comprising:
receiving, using the at least one processor, a continuous play function request from the first user terminal apparatus.

15. The method of claim 14, wherein the receiving of the continuous play function request comprises:
transmitting an application program comprising a continuous play function menu to the first user terminal apparatus according to a request of the first user terminal apparatus; and
receiving the continuous play function request from the first user terminal apparatus when a user of the first user terminal apparatus selects the continuous play function menu.

16. The method of claim 15, wherein the application program displays the continuous play function menu in a first region of the screen when the first user terminal apparatus accesses a web page corresponding to a URL through a web browser, and displays the continuous play function menu in a second region of the screen when the first user terminal apparatus accesses a web page that does not correspond to the URL.

17. The method of claim 1, wherein the transmitting of the at least one piece of web page information comprises:
transmitting the at least one piece of web page information to the first user terminal apparatus after classifying the at least one piece of web page information into information about a web page at least one of the plurality of second user terminal apparatuses is currently accessing and information about a web page at least one of the plurality of second user terminal apparatuses ended accessing.

18. A method of providing a continuous play service by a server apparatus, the method comprising:
receiving, using at least one processor, first user information from a first user terminal apparatus;
receiving, using the at least one processor, web page information about a web page accessed by the first user terminal apparatus from the first user terminal apparatus, the web page information including information corresponding to at least one web page previously accessed by the first user terminal apparatus;
associating, using the at least one processor, the first user information and the web page information;
receiving, using the at least one processor, second user information from a second user terminal apparatus that is different from the first user terminal apparatus;
transmitting, using the at least one processor, the web page information, which is associated with the first user information, to the second user terminal apparatus, when the first user information corresponds to the second user information, such that the web page information is displayed on a screen of the second user terminal apparatus;
receiving, using the at least one processor, information associated with a spot displayed on a screen of the first user terminal apparatus from an entire region of a selected web page which was previously accessed by the first user terminal apparatus, when the web page is selected by the second user terminal apparatus from the web page information; and
transmitting, using the at least one processor, a control command for displaying the spot on the screen of the first user terminal apparatus to the second user terminal apparatus.

19. A method of providing a continuous play service by a first user terminal apparatus, the method comprising:
receiving, using at least one processor, a continuous play function request from a user;
obtaining, using the at least one processor, at least one piece of web page information previously accessed by at least one of a plurality of second user terminal apparatuses from an external server, the plurality of second user terminal apparatuses including the first user terminal apparatus;
transmitting, using the at least one processor, the at least one piece of web page information to the first user terminal apparatus;
displaying, using the at least one processor, the at least one piece of web page information on a screen of the first user terminal apparatus;
receiving, using the at least one processor, information associated with a spot displayed on a screen of the at least one of the plurality of second user terminal apparatuses from an entire region of a selected web page which was previously accessed by the at least one of the plurality of second user terminal apparatuses, when the web page is selected by the first user terminal apparatus from the at least one piece of web page information;
transmitting, using the at least one processor, a control command for displaying the spot on the screen of the first user terminal apparatus to the first user terminal apparatus; and
accessing, using the at least one processor, a web page selected by the user from the at least one piece of web page information.

* * * * *